United States Patent
Kim et al.

(10) Patent No.: US 12,260,612 B2
(45) Date of Patent: Mar. 25, 2025

(54) IMPACT MOTION RECOGNITION SYSTEM FOR SCREEN-BASED MULTI-SPORT COACHING

(71) Applicant: ELECTRONICS AND TELECOMMUNICATIONS RESEARCH INSTITUTE, Daejeon (KR)

(72) Inventors: Jong Sung Kim, Daejeon (KR); Seong Il Yang, Daejeon (KR); Min Sung Yoon, Daejeon (KR); Si Hwan Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 504 days.

(21) Appl. No.: 17/509,615

(22) Filed: Oct. 25, 2021

(65) Prior Publication Data

US 2022/0319151 A1 Oct. 6, 2022

(30) Foreign Application Priority Data

Mar. 31, 2021 (KR) .................. 10-2021-0041993

(51) Int. Cl.
  *G06V 10/764* (2022.01)
  *G06V 10/28* (2022.01)
  *G06V 20/40* (2022.01)
(52) U.S. Cl.
  CPC ............ *G06V 10/764* (2022.01); *G06V 10/28* (2022.01); *G06V 20/42* (2022.01)
(58) Field of Classification Search
  CPC ....... G06V 10/764; G06V 20/42; G06V 10/28
  See application file for complete search history.

(56) References Cited

U.S. PATENT DOCUMENTS

| 9,821,209 B2 | 11/2017 | Ueda et al. |
| 10,122,921 B2 | 11/2018 | Kim et al. |

(Continued)

FOREIGN PATENT DOCUMENTS

| KR | 10-1078975 | 11/2011 |
| KR | 10-1300374 | 8/2013 |

(Continued)

OTHER PUBLICATIONS

Wang, Shaobo, et al. "Tracking a golf ball with high-speed stereo vision system." IEEE Transactions on Instrumentation and Measurement 68.8 (2018): 2742-2754. (Year: 2018).*

*Primary Examiner* — Utpal D Shah
(74) *Attorney, Agent, or Firm* — KILE PARK REED & HOUTTEMAN PLLC (57) ABSTRACT

Provided is an impact motion recognition system for screen-based multi-sport coaching. The impact motion recognition system for screen-based multi-sport coaching includes: a high-speed stereo camera device installed on an upper end of a target object including a hitting body and an moving body and configured to acquire a stereo image sequence in which the hitting body and the moving body are photographed; an object detection unit configured to detect an object in the acquired stereo image sequence; a moving body recognition unit configured to identify whether an impact motion has occurred in the detected object to recognize the moving body; a hitting body detection unit configured to, based on the moving body being recognized through the moving body recognition unit, detect the object excluding the moving body as the hitting body; a target object tracking unit configured to continuously detect a center point of the moving body and a feature point of the hitting body in a subsequent stereo image sequence using characteristics of the moving body and the hitting body that are detected, and continuously track the center point of the moving body and (Continued)

the feature point of the hitting body until the center point of the moving body and the feature point of the hitting body are not detected; and a motion analysis unit configured to analyze three-dimensional (3D) motion information of the target object using the center point of the moving body and the feature point of the hitting body, which are detected through the target object tracking unit, and high-speed stereo camera correction data.

20 Claims, 12 Drawing Sheets

(56) References Cited

U.S. PATENT DOCUMENTS

| | | | | |
|---|---|---|---|---|
| 10,486,043 | B2* | 11/2019 | Joo | G06T 7/70 |
| 10,742,864 | B2* | 8/2020 | Khazanov | H04N 23/66 |
| 2012/0289296 | A1* | 11/2012 | Marty | G06T 13/20 |
| | | | | 463/3 |
| 2017/0124388 | A1* | 5/2017 | Ueda | G06V 20/42 |
| 2017/0256063 | A1 | 9/2017 | Baek et al. | |
| 2018/0053308 | A1* | 2/2018 | Maani | G06T 7/251 |
| 2018/0121608 | A1* | 5/2018 | Gross | G16H 20/30 |
| 2019/0060734 | A1 | 2/2019 | Molinari et al. | |
| 2019/0192950 | A1* | 6/2019 | Tuxen | A63B 71/06 |
| 2022/0284628 | A1* | 9/2022 | Tuxen | A63B 71/0616 |
| 2022/0405943 | A1* | 12/2022 | Yokoyama | G06V 20/42 |
| 2024/0244337 | A1* | 7/2024 | Bales | G06T 7/292 |

FOREIGN PATENT DOCUMENTS

| | | |
|---|---|---|
| KR | 10-1694772 | 1/2017 |
| KR | 10-2017-0133730 | 12/2017 |
| KR | 10-2018-0002408 | 1/2018 |
| KR | 10-1813522 | 1/2018 |
| KR | 10-2018-0085843 | 7/2018 |
| KR | 10-1865145 | 7/2018 |
| KR | 10-2021-0014409 | 2/2021 |
| KR | 10-2226623 | 3/2021 |

* cited by examiner

IMPACT MOTION RECOGNITION SYSTEM FOR SCREEN-BASED MULTI-SPORT COACHING

CROSS-REFERENCE TO RELATED APPLICATION

This application claims priority to and the benefit of Korean Patent Application No. 10-2021-0041993, filed on Mar. 31, 2021, the disclosure of which is incorporated herein by reference in its entirety.

BACKGROUND

1. Field of the Invention

The present invention relates to an impact motion recognition system for screen-based multi-sport coaching.

2. Discussion of Related Art

In general impact motion analysis technology for screen sports, several types of methods are employed including an attachable sensor type method in which a motion measurement sensor including an acceleration sensor, a gyro sensor, and the like is attached to a tool, such as a golf club so that a swing speed, a swing trajectory and the like are analyzed as disclosed in Korean Laid-open Patent Publication Nos. 10-2015-0082121, 10-2015-0108014, 10-2017-0009057, etc., and a floor sensor type method in which a motion-detecting sensor including an infrared sensor, an ultrasonic sensor, and the like is attached to a plate so that the moment of impact is recognized and then the swing speed is analyzed as disclosed in Korean Registered Patent No. 10-1300374.

Such attachable sensor type or floor sensor type impact motion analysis technology has a difficulty in attaching a special sensor to the human body or a tool or installing a special sensor on a plate separately from a screen-based sports system for coaching, and a difficulty in attaching or installing a different sensor for each type of sport, thus having limitation in being applied to screen-based multi-sport coaching.

SUMMARY OF THE INVENTION

The present invention is directed to providing an impact motion recognition system for screen-based multi-sport coaching that is capable of detecting a moving object only using an image acquired through a high-speed stereo camera usable for a screen-based multi-sport system, recognizing an impact motion, and automatically analyzing time information of an impact moment at which a user hits a moving body with a hitting body and three-dimensional (3D) motion information including 3D trajectory, speed, angle, and spin of the moving body and the hitting body at the impact moment regardless of the type of sport and providing the analyzed time information and 3D motion information.

The technical objectives of the present invention are not limited to the above, and other objectives may become apparent to those of ordinary skill in the art based on the following description.

According to an aspect of the present invention, there is provided an impact motion recognition system for screen-based multi-sport coaching, the impact motion recognition system including: a high-speed stereo camera device installed on an upper end of a target object including a hitting body and an moving body and configured to acquire a stereo image sequence in which the hitting body and the moving body are photographed; an object detection unit configured to detect an object in the acquired stereo image sequence; a moving body recognition unit configured to identify whether an impact motion has occurred in the detected object to recognize the moving body; a hitting body detection unit configured to, based on the moving body being recognized through the moving body recognition unit, detect the object excluding the moving body as the hitting body; a target object tracking unit configured to continuously detect a center point of the moving body and a feature point of the hitting body in a subsequent stereo image sequence using characteristics of the moving body and the hitting body that are detected, and continuously track the center point of the moving body and the feature point of the hitting body until the center point of the moving body and the feature point of the hitting body are not detected; and a motion analysis unit configured to analyze three-dimensional (3D) motion information of the target object using the center point of the moving body and the feature point of the hitting body, which are detected through the target object tracking unit, and high-speed stereo camera correction data.

The high-speed stereo camera device may have a shooting speed corresponding to 300 or more frames per second (fps).

The object detection unit may be configured to classify the target object and a background through a difference in brightness in the acquired stereo image sequence and remove the background.

The moving body recognition unit may be configured to, among the detected objects, exclude a stationary object and identify whether an object in motion detected is the moving body using a circular model fitting technique based on a center point and radius from among the detected objects in motion, and when there is the moving body in motion, identify that the impact motion has occurred.

The hitting body detection unit may be configured to store only the feature point of the detected hitting object as data to perform motion analysis on the detected hitting body.

The motion analysis unit may be configured to restore 3D trajectories of the moving body and the hitting body through a triangulation technique, and analyze the 3D motion information including a 3D velocity, angle, and spin from the restored 3D trajectories.

The high-speed stereo camera correction data may include a focal length, a center of light, a 3D direction, and 3D position information of each of the high-speed stereo camera devices.

The present invention may further include an infrared illumination device configured to provide the target object with high-brightness infrared illumination.

According to an aspect of the present invention, there is provided an impact motion recognition method for screen-based multi-sport coaching, the impact motion recognition method including: acquiring, by a high-speed stereo camera device installed on an upper end of a target object including a hitting body and an moving body, a stereo image sequence in which the hitting body and the moving body are photographed; detecting, by an object detection unit, an object in motion in the acquired stereo image sequence; identifying, by a moving body recognition unit, whether an impact motion has occurred in the detected object to recognize the moving body; through recognition of the impact motion, detecting, by a hitting body detection unit, the object excluding the moving body as the hitting body; continuously detecting, by a target object tracking unit, a center point of the moving body and a feature point of the hitting body in a subsequent stereo image sequence using characteristics of the moving body and the hitting body that are detected, and continuously tracking the center point of the moving body and the feature point of the hitting body until the center point of the moving body and the feature point of the hitting body are not detected; and analyzing, by a motion analysis unit, three-dimensional (3D) motion information of the target object using the center point of the moving body and the feature point of the hitting body, which are detected through the target object tracking unit, and high-speed stereo camera correction data.

The recognizing of the moving body may include, among the detected objects, excluding a stationary object and identifying whether an object in motion detected is the moving body using a circular model fitting technique based on a center point and radius from among the detected objects in motion, and when there is the moving body in motion, identifying that the impact motion has occurred.

The analyzing of the motion may include restoring 3D trajectories of the moving body and the hitting body through a triangulation technique, and analyzing the 3D motion information including a 3D velocity, angle, and spin from the restored 3D trajectories.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims. Terms used herein are used to aid in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Figure 1:
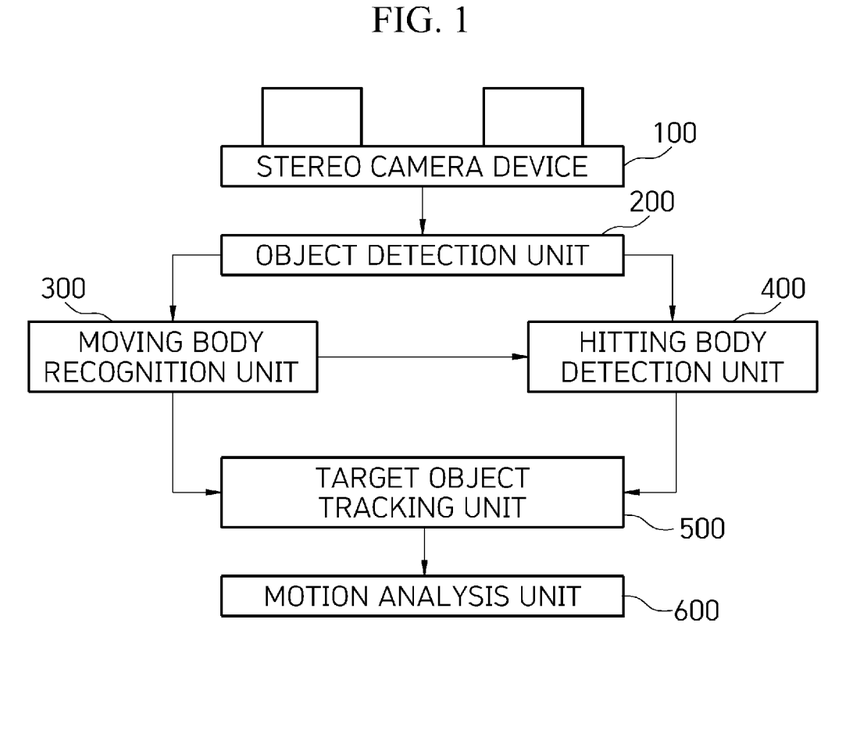
FIG. 1 is a block diagram illustrating an impact motion recognition system for screen-based multi-sport coaching according to an embodiment of the present invention.

FIG. 1 is a block diagram illustrating an impact motion recognition system for screen-based multi-sport coaching according to an embodiment of the present invention.

Referring to FIG. 1, the impact motion recognition system for screen-based multi-sport coaching according to the embodiment of the present invention includes a stereo camera device 100, an object detection unit 200, a moving body recognition unit 300, a hitting body detection unit 400, a target object tracking unit 500, and a motion analysis unit 600.

Figure 2:
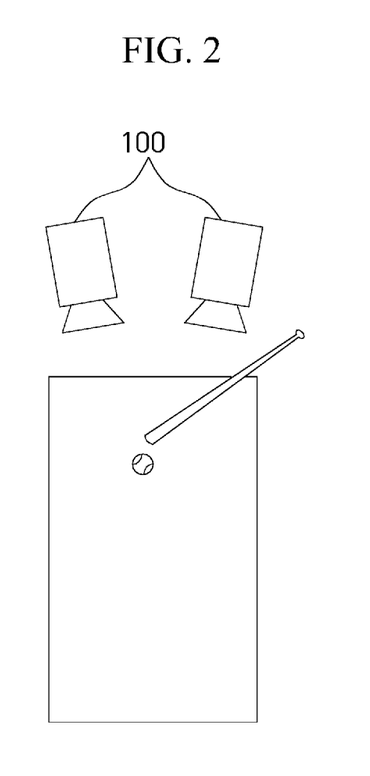
FIG. 2 is a reference diagram for describing an example of installation of a stereo camera device shown in FIG. 1.
Figure 3:
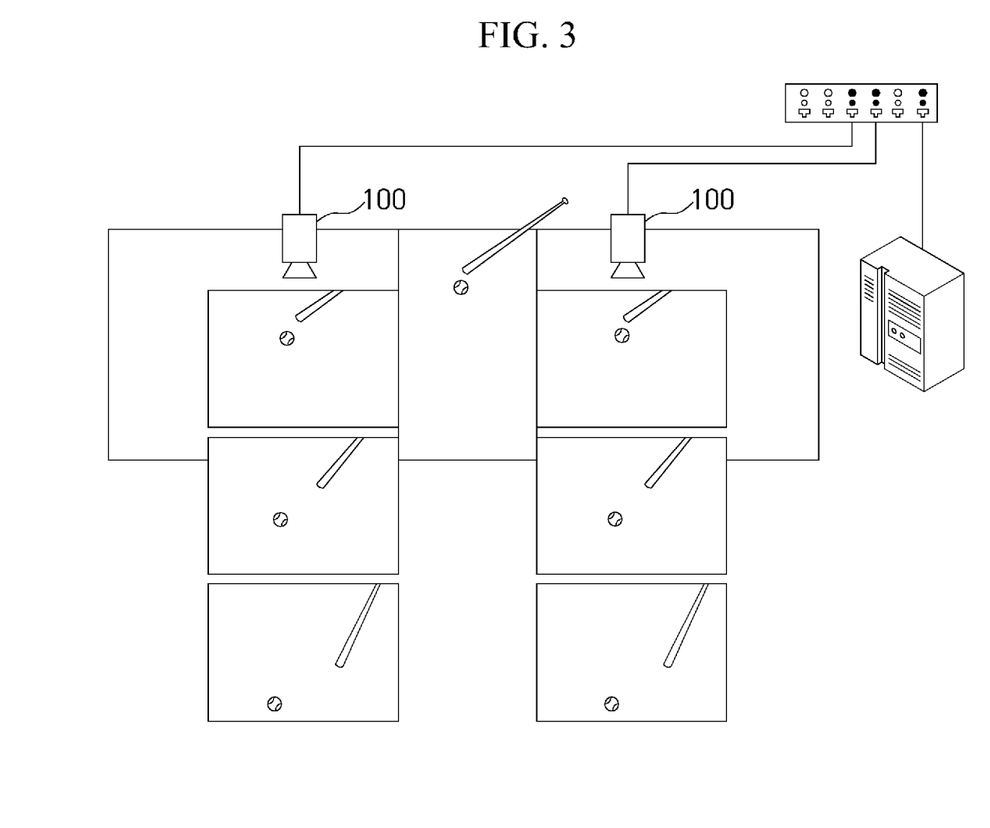
FIG. 3 is a reference diagram for describing an example of a stereo image sequence of a baseball and a bat photographed by the impact motion recognition system for screen-based multi-sport coaching according to the embodiment of the present invention.
Figure 4:
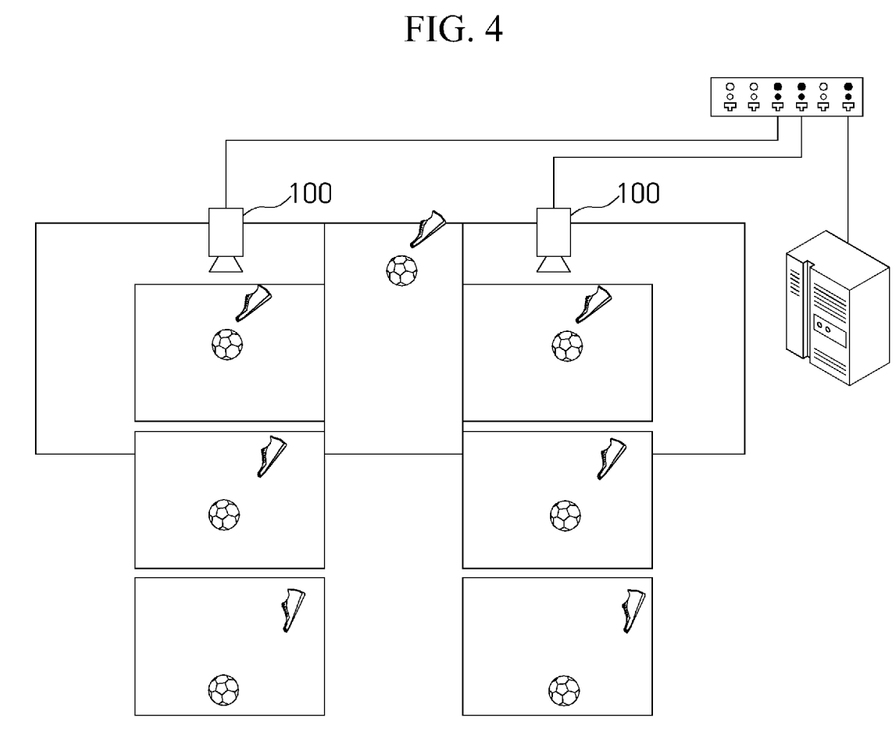
FIG. 4 is a reference diagram for describing an example of a stereo image sequence of a soccer ball and a shoe photographed by the impact motion recognition system for screen-based multi-sport coaching according to the embodiment of the present invention.
Figure 5:
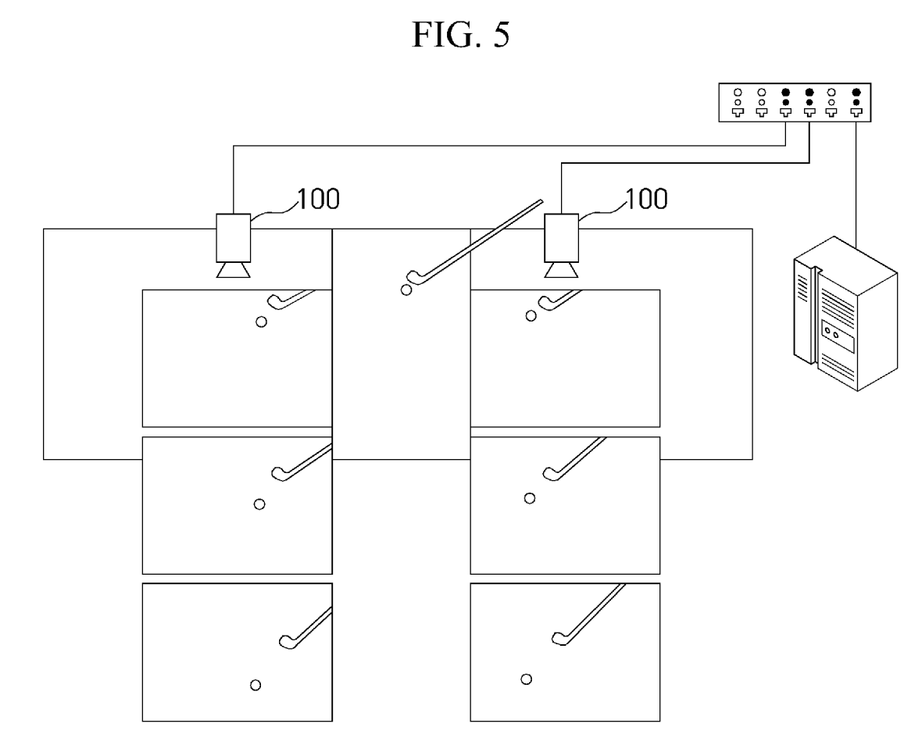
FIG. 5 is a reference diagram for describing an example of a stereo image sequence of a golf ball and a golf club photographed by the impact motion recognition system for screen-based multi-sport coaching according to the embodiment of the present invention.

Referring to FIG. 2, the high-speed stereo camera device 100 is installed on an upper end of a target object including a hitting body and a moving body, and acquires a stereo image sequence in which the hitting body and the moving body are photographed. The high-speed stereo camera device 100 includes two cameras, that is, a left high-speed camera and a right high-speed camera, for analysis of three-dimensional (3D) motion information required for sports simulation, and at the moment of an impact, acquires a stereo image sequence including a hitting body, such as a shoe, a bat, a club, or the like, and a moving body, such as a soccer ball, a baseball, a golf ball, or the like at high speed in real time. For example, FIG. 3 illustrates a stereo image sequence in which the moving body is a baseball and the hitting body is a bat, FIG. 4 illustrates a stereo image sequence in which the moving body is a soccer ball and the hitting body is a shoe, and FIG. 5 illustrates a stereo image sequence in which a moving body is a golf ball and the hitting body is a golf club. To this end, the high-speed stereo camera device 100 may have a shooting speed corresponding to 300 or more frames per second (fps). An infrared illumination device 110 may provide high luminance infrared illumination to the target object.

The object detection unit 200 detects an object in the acquired stereo image sequence. Referring to FIG. 4, the object detection unit 200 classifies a target object O1 and a background B based on the difference in brightness in the acquired stereo image sequence and removes the background B.

Figure 6A:
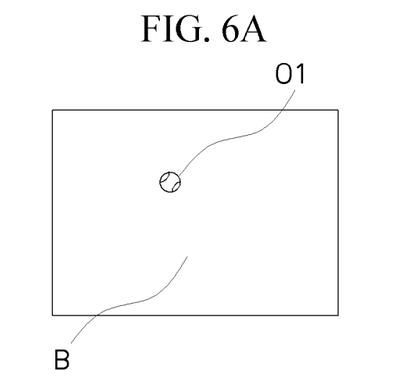
FIGS. 6A to 6F are reference views for describing an example of a moving body and a hitting body photographed in a stereo image sequence according to an embodiment of the present invention.
Figure 6B:
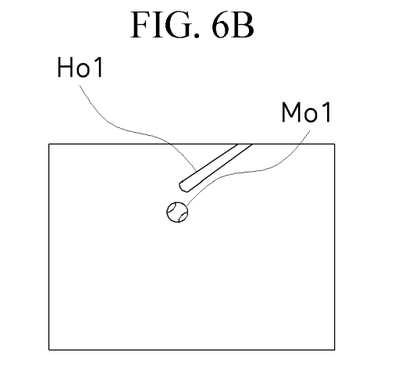

The moving body recognition unit 300 recognizes the moving body by identifying whether an impact motion has occurred using the detected object. The moving body recognition unit 300 excludes a stationary object from among the objects detected by the object detection unit 200, and as shown in FIG. 4B, based on objects Mo1 and Ho1 in motion being detected, identifies whether the detected object in motion is a moving body Mo1 using a circular model fitting technique based on a center point and radius from among the detected objects Mo1 and Ho1 in motion. When there is a moving body Mo1 in motion, the moving body recognition unit 300 identifies that an impact motion has occurred.

Referring to FIG. 6B, when the moving body Mo1 is recognized through the moving body recognition unit 300, the hitting body detection unit 400 identifies the other object Ho1 in motion, which is not the moving body Mo1, as the hitting body. Here, it is preferable that the hitting body detection unit 400 stores only the feature points of the detected hitting body as data for motion analysis of the detected hitting body.

Figure 6C:
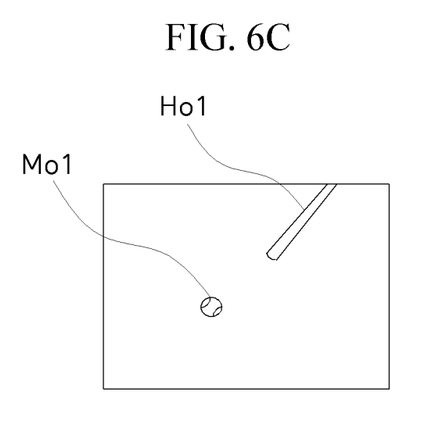
Figure 6D:
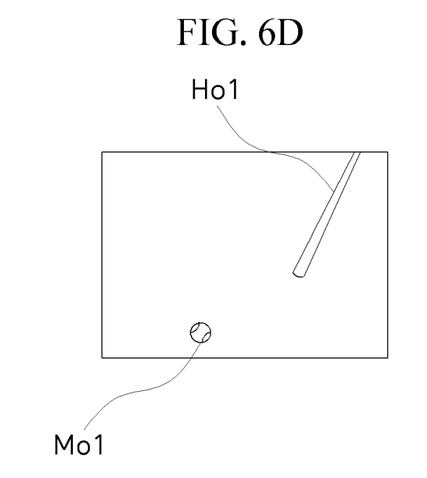
Figure 6E:
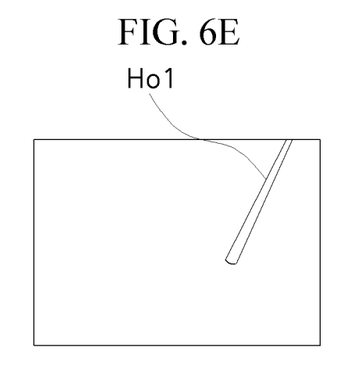
Figure 6F:
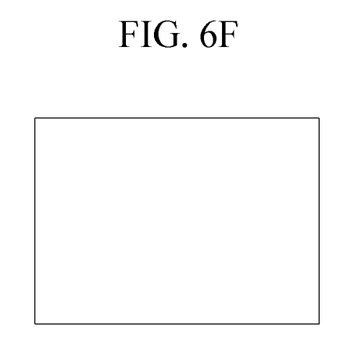

The target object tracking unit 500 continuously detects a center point of the moving body Mo1 and a feature point of the hitting body Ho1 in a subsequent stereo image sequence using characteristics of the moving body Mo1 and the hitting body Ho1 that are detected as shown in FIGS. 6C to 6E, and continuously track the center point of the moving body Mo1 and the feature point of the hitting body Ho1 until the center point of the moving body Mo1 and the feature point of the hitting body Ho1 are not detected as shown in FIG. 6F.

Figure 7:
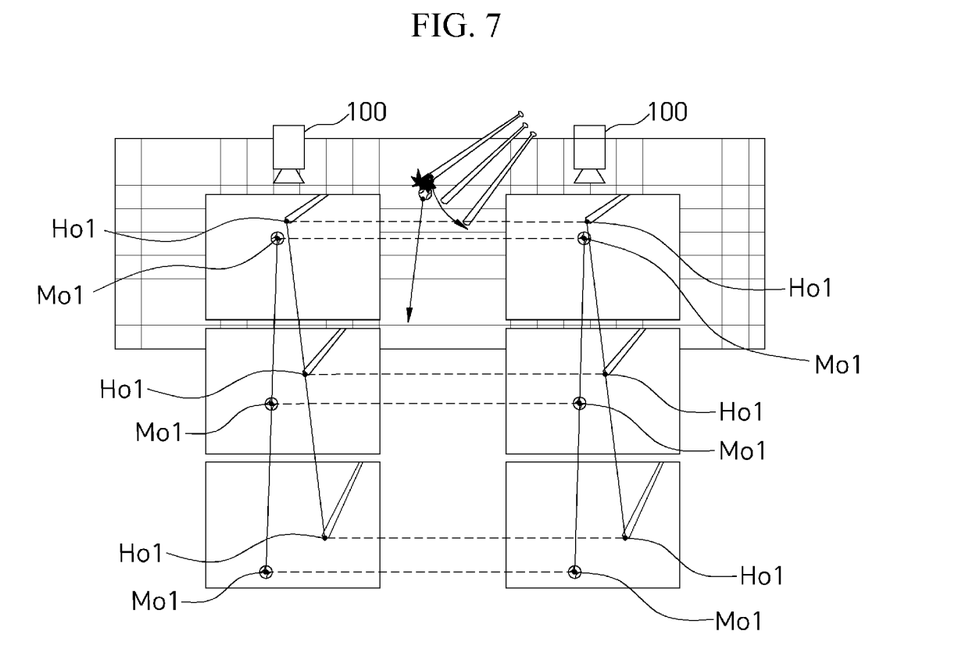
FIG. 7 is a reference diagram for describing an example of analyzing a three-dimensional motion of a moving body of a baseball and a hitting body of a bat in an embodiment of the present invention.

Referring to FIG. 7, the motion analysis unit 600 analyzes three-dimensional (3D) motion information of the target object using the center point of the moving body Mo1 and the feature point of the hitting body Ho1 detected through the target object tracking unit 500, and camera correction data including a focal length, a center of light, a 3D direction, and 3D position information of each of the high-speed stereo camera devices 100. The motion analysis unit 600 restores 3D trajectories of the moving body Mo1 and the hitting body Ho1 through a triangulation technique between the high-speed stereo camera device 100, the moving object Mo1, and the hitting object Ho1, and analyzes the 3D motion information including a 3D velocity, angle, and spin from the restored 3D trajectories.

For example, in the case of soccer, when an impact, such as a kick, occurs, the speed and angle of the impact of a soccer shoe hitting a soccer ball, the impact point where the soccer shoe has collided with the soccer ball, the position of the stepping foot, the initial speed, angle, spin, and the like of the soccer ball immediately after the impact may be analyzed, and through a soccer simulation using such initial motion values of the soccer ball, the final trajectory, moving distance, goal or not, and the like of the soccer ball is predicted so that the prediction may be used for soccer coaching.

In addition, in the case of baseball, when an impact, such as batting, occurs, the impact speed, attack angle, and power of a bat hitting a baseball, and the impact point where the bat has collided with the baseball, the trajectory of the bat, and the initial speed, angle, and spin of the baseball immediately after the impact may be analyzed, and through a baseball simulation using such initial motion values of the baseball, the final trajectory, moving distance, hit, foul, home run, and the like of the baseball is predicted so that the prediction may be used for baseball coaching.

In addition, in the case of golf, when an impact, such as a drive shot or an iron shot, occurs, the speed and face angle of the club head at the moment of the impact of the club head hitting the golf ball, the impact point where the club has collided with the golf ball and the swing trajectory of the club head, and the initial speed, launch angle, azimuth, backspin, side spin and the like of the golf ball immediately after the impact may be analyzed, and through a golf simulation using such initial motion values of the golf ball, the final trajectory, flying distance, slice, hook status, and the like of the golf ball is predicted so that the prediction may be used for golf coaching.

Figure 8:
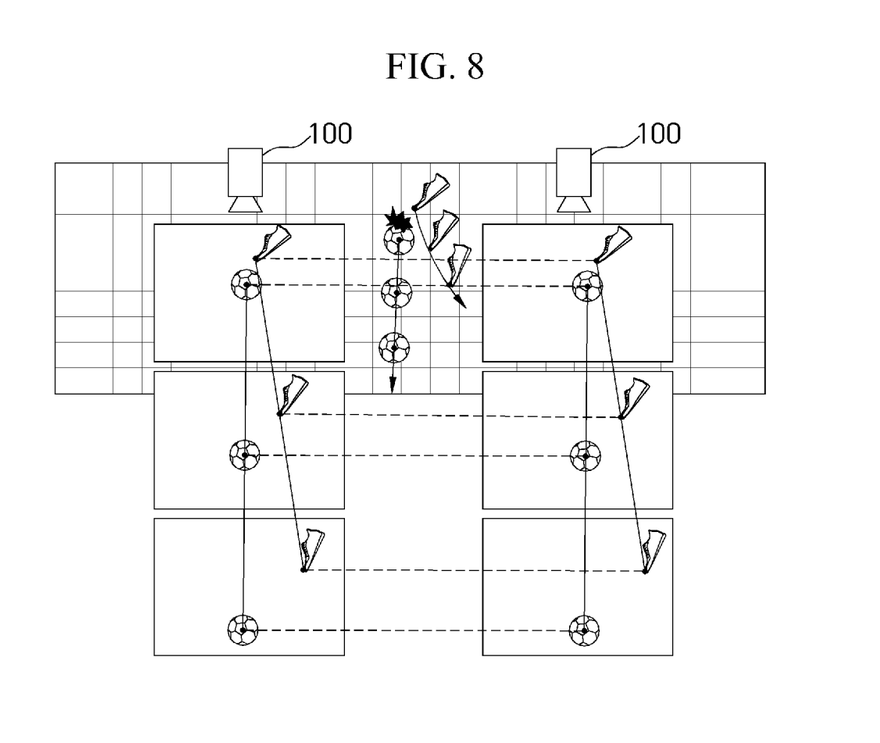
FIG. 8 is a reference diagram for describing an example of analyzing a three-dimensional motion of a moving body of a soccer ball and a hitting body of a shoe in an embodiment of the present invention.
Figure 9:
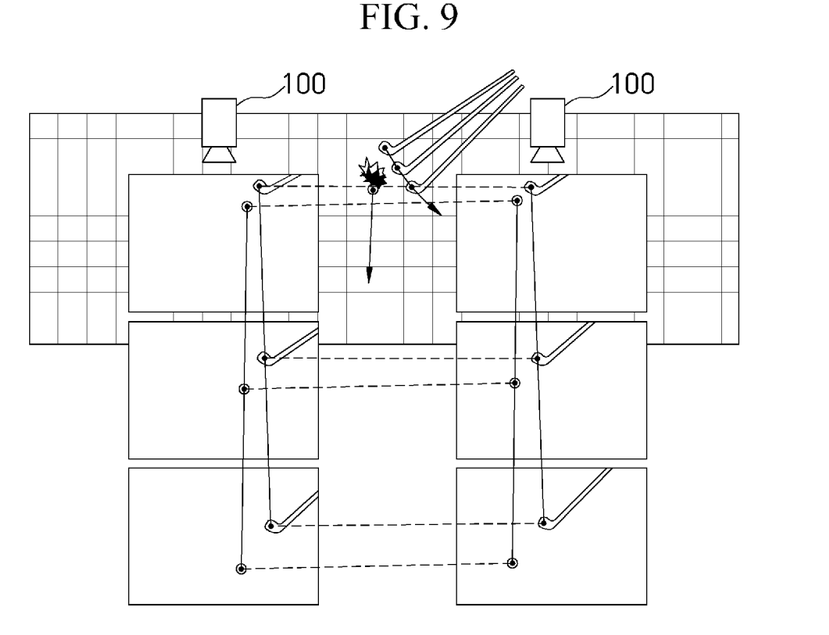
FIG. 9 is a reference diagram for describing an example of analyzing a three-dimensional motion of a moving body of a golf ball and a hitting body of a golf club in an embodiment of the present invention.

In addition, the motion analysis unit 600 according to the present invention may analyze 3D motion information about the moving body, such as a soccer ball, and the hitting body, such as a soccer shoe, as shown in FIG. 8, and may analyze 3D motion information about the moving body, such as a golf ball, and the hitting body, such as a golf club, as shown in FIG. 9.

According to the embodiment of the present invention, the screen-based multi-sport system may analyze only the moment of an impact of a user who desires to learn screen sport safely and easily indoors.

Therefore, the present invention has an effect of recognizing an impact motion, such as a soccer kick, a baseball batting, and a golf swing, which is most important in their respective sports, only using an image acquired through a high-speed stereo camera usable for a screen-based multi-sport system, and automatically analyzing time information of the moment of the impact at which a user has hit a moving body with a hitting body and 3D motion information including a 3D trajectory, speed, angle, and spin of the moving body and the hitting body at the moment of the impact regardless of the type of sport and providing the analyzed time information and 3D motion information.

Figure 10:
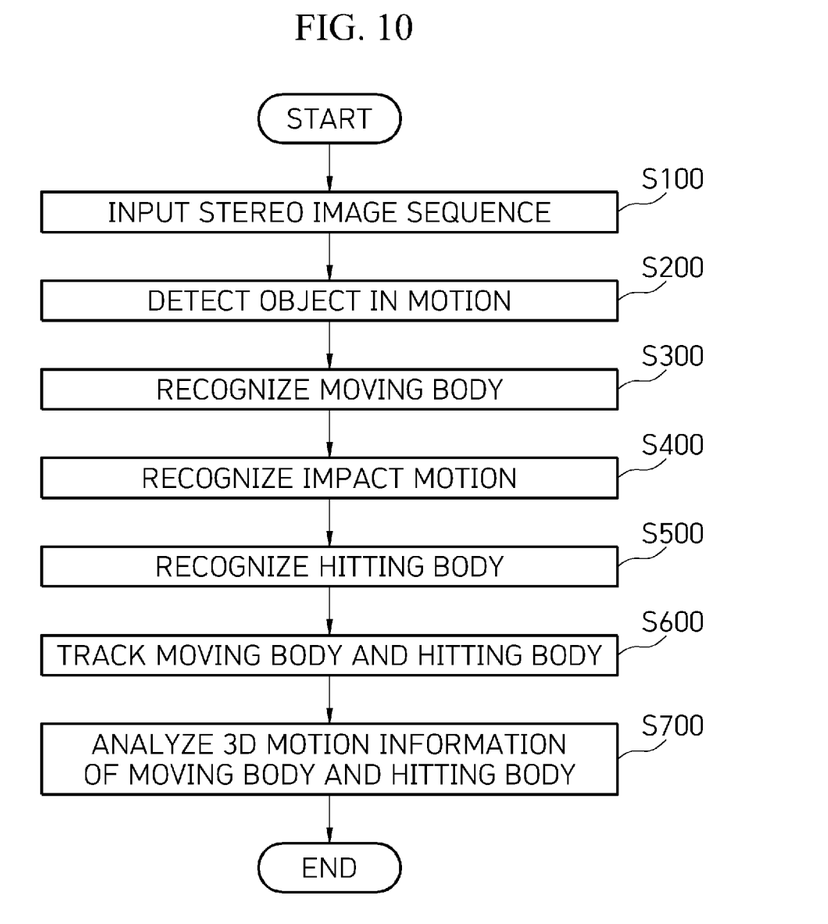
FIG. 10 is a flowchart showing an impact motion recognition method for screen-based multi-sport coaching according to an embodiment of the present invention.

Hereinafter, an impact motion recognition method for screen-based multi-sport coaching according to an embodiment of the present invention will be described with reference to FIG. 10.

First, a stereo image sequence in which a hitting body and a moving body are photographed is acquired by a high-speed stereo camera device installed on an upper end of a target object including the hitting body and the moving body (S100). The high-speed stereo camera device may preferably have a shooting speed corresponding to 300 or more fps. In addition, the present invention may further include an infrared illumination device that provides high-luminance infrared illumination to the target object.

Next, an object having a motion in the acquired stereo image sequence is detected by the object detection unit (S200). In the operation S200 of detecting the object, a background and a target object are classified based on the difference in brightness in the acquired stereo image sequence, and the background is removed.

A moving body is recognized through identifying whether an impact motion has occurred in the detected object by the moving body recognition unit (S300). The operation S300 of recognizing the moving body includes excluding a stationary object from among the detected objects, and among the detected objects in motion, identifying whether the detected object is a moving body using a circular model fitting technique based on a center point and radius.

Thereafter, it is detected whether an impact motion has occurred through a motion of the other object, which is not the moving body, by the hitting body detection unit (S400).

Next, an object in motion, which is not the moving body, is recognized as the hitting body by the hitting body detection unit (S500). The operation S500 of detecting the hitting body includes storing only the feature point of the detected hitting body as data for motion analysis of the detected hitting body.

The center point of the moving body and the feature point of the hitting body in a subsequent stereo image sequence are continuously detected using characteristics of the detected moving body and hitting body by the target object tracking, and the center point of the moving body and the feature point of the hitting body are continuously tracked until the center point of the moving body and the feature point of the hitting body are not detected (S600). In the operation S600 of tracking the target object, preferably, the moving body and the hitting body are independently tracked, and the center point data of the moving body and the feature point data of the hitting body are independently tracked.

Thereafter, 3D motion information of the target object is analyzed using the center point of the moving body and the feature point of the hitting body that are detected through the target object tracking unit, and high-speed stereo camera correction data by the motion analysis unit (S700). In the operation S700 of analyzing the motion, 3D trajectories of the moving body and the hitting body are restored through a triangulation technique, and the 3D motion information including a 3D velocity, angle, and spin is analyzed from the restored 3D trajectories. Here, the high-speed stereo camera correction data includes a focal length, a center of light, a 3D direction, and 3D position information of each of the high-speed stereo camera devices.

As is apparent from the above, the impact motion recognition system for screen-based multi-sport coaching according to the embodiment of the present invention, in order to coach a user who desires to learn screen sports safely and easily through a screen-based multi-sport system indoors, can recognize an impact motion, such as a soccer kick, baseball batting, and golf swing, which is most important in sport, only using an image acquired through a high-speed stereo camera usable for a screen-based multi-sport system, without using an attachable sensor or a floor sensor, and then automatically analyze time information of the motion of the impact at which a user has hit a moving body with a hitting body and three-dimensional (3D) motion information including 3D trajectory, speed, angle, and spin of the moving body and the hitting body at the moment of the impact regardless of the type of sport and provide the analyzed time information and 3D motion information.

Although the present invention has been described in detail above with reference to the accompanying drawings, those of ordinary skill in the technical field to which the present invention pertains should be able to understand that various modifications and alterations may be made without departing from the technical spirit or essential features of the present invention. The scope of the present invention is not defined by the above embodiments but by the appended claims of the present invention.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An impact motion recognition system for a screen-based multi-sport coaching system, the impact motion recognition system comprising:
   a high-speed stereo camera device positioned to observe a target object including a hitting body and a moving body, and configured to acquire a stereo image sequence from a moment of impact between the hitting body and the moving body;
   an object detection unit configured to detect objects in motion in the acquired stereo image sequence;

a moving body recognition unit configured to identify that an impact motion has occurred between the objects in motion and to recognize, in response to the identification of the impact motion of the impact, the moving body from among the objects in motion;

a hitting body detection unit configured to, in response to the identification of the impact motion of the impact and based on the moving body being recognized through the moving body recognition unit, detect the hitting body from among the objects in motion excluding the moving body;

a target object tracking unit configured to continuously detect a center point of the moving body and a feature point of the hitting body in a subsequent stereo image sequence using characteristics of the moving body and the hitting body that are detected, and to continuously track the center point of the moving body and the feature point of the hitting body until the center point of the moving body and the feature point of the hitting body are not detected; and a motion analysis unit configured to analyze three-dimensional (3D) motion information of the target object using the center point of the moving body and the feature point of the hitting body, which are detected through the target object tracking unit, and high-speed stereo camera correction data and to output, based on the analyzation, sport-specific information about the impact from among coachable sports of the multi-sport coaching system.

2. The impact motion recognition system of claim 1, wherein the high-speed stereo camera device has a shooting speed corresponding to 300 or more frames per second (fps).

3. The impact motion recognition system of claim 1, wherein the object detection unit is configured to classify the target object and a background through a difference in brightness in the acquired stereo image sequence and to remove the background.

4. The impact motion recognition system of claim 1, wherein:
the moving body recognition unit is configured to, from among objects in the acquired stereo image sequence, exclude a stationary object to recognize the moving body using a circular model fitting technique, which is based on a center point and a radius; and
the moving body recognition unit is configured to, in response to the moving body in motion being recognized, identify the impact motion.

5. The impact motion recognition system of claim 1, wherein the hitting body detection unit is configured to store only the feature point of the detected hitting object as data to perform motion analysis on the detected hitting body.

6. The impact motion recognition system of claim 1, wherein the motion analysis unit is configured to restore 3D trajectories of the moving body and the hitting body through a triangulation technique, and to analyze the 3D motion information including a 3D velocity, angle, and spin from the restored 3D trajectories.

7. The impact motion recognition system of claim 1, wherein
the high-speed stereo camera includes multiple high-speed stereo camera devices, and
the high-speed stereo camera correction data includes a focal length, a center of light, a 3D direction, and 3D position information of each of the high-speed stereo camera devices.

8. The impact motion recognition system of claim 1, further comprising an infrared illumination device configured to provide high-brightness infrared illumination to the target object.

9. An impact motion recognition method for a screen-based multi-sport coaching system, the impact motion recognition method comprising:
acquiring, by a high-speed stereo camera device positioned to observe a target object including a hitting body and a moving body, a stereo image sequence from a moment of impact between the hitting body and the moving body;
detecting, by an object detection unit, objects in motion in the acquired stereo image sequence;
identifying, by a moving body recognition unit, that an impact motion has occurred between the objects in motion;
recognizing, by the moving body recognition unit, the moving body from among the objects in motion in response to the identifying of the impact motion;
detecting, by a hitting body detection unit in response to both the identifying of the impact motion and the recognizing of the moving body, the hitting body from among the objects in motion excluding the moving body;
continuously detecting, by a target object tracking unit, a center point of the moving body and a feature point of the hitting body in a subsequent stereo image sequence using characteristics of the moving body and the hitting body that are detected, and continuously tracking the center point of the moving body and the feature point of the hitting body until the center point of the moving body and the feature point of the hitting body are not detected;
analyzing, by a motion analysis unit, three-dimensional (3D) motion information of the target object using the center point of the moving body and the feature point of the hitting body, which are detected through the target object tracking unit, and high-speed stereo camera correction data; and
outputting, by the motion analysis unit based on the analyzing, sport-specific information about the impact from among coachable sports of the multi-sport coaching system.

10. The impact motion recognition method of claim 9, wherein the high-speed stereo camera device has a shooting speed corresponding to 300 or more frames per second (fps).

11. The impact motion recognition method of claim 9, wherein the detecting of the object includes classifying the target object and a background through a difference in brightness in the acquired stereo image sequence and removing the background.

12. The impact motion recognition method of claim 9, wherein the recognizing of the moving body includes, from among objects in the acquired stereo image sequence, excluding a stationary object to recognize the moving body using a circular model fitting technique, which is based on a center point and a radius, and in response to the moving body in motion being recognized, identifying that the impact motion.

13. The impact motion recognition method of claim 9, wherein the detecting of the hitting body includes storing only the feature point of the detected hitting object as data to perform motion analysis on the detected hitting body.

14. The impact motion recognition method of claim 9, wherein the analyzing of the motion includes:

restoring 3D trajectories of the moving body and the hitting body through a triangulation technique; and analyzing the 3D motion information including a 3D velocity, angle, and spin from the restored 3D trajectories.

15. The impact motion recognition method of claim 9, wherein the high-speed stereo camera includes multiple high-speed stereo camera devices, and the high-speed stereo camera correction data includes a focal length, a center of light, a 3D direction, and 3D position information of each of the high-speed stereo camera devices.

16. The impact motion recognition method of claim 9, further comprising an infrared illumination device configured to provide high-brightness infrared illumination to the target object.

17. The impact motion recognition system of claim 1, wherein the 3D motion information includes relative points on the moving body and the hitting body at which the moving body and the hitting body impacted one another.

18. The impact motion recognition method of claim 9, wherein the 3D motion information includes relative points on the moving body and the hitting body at which the moving body and the hitting body impacted one another.

19. The impact motion recognition system of claim 1, wherein the high-speed stereo camera device has a field of view, the target object tracking unit is configured to continuously track the center point of the moving body independent of the hitting body and until the center point of the moving body exits the field of view, and the target object tracking unit is configured to continuously track the feature point of the hitting body independent of the moving body and until the feature point of the hitting body exits the field of view.

20. The impact motion recognition system of claim 1, wherein in response to recognition of the moving body as a ball and detection of the hitting body as a first foot of a coachee, the motion analysis unit is configured to:

determine motion values including an impact speed and angle of impact of the first foot with the ball; a position of a second foot of the coachee during the impact; a position of impact between the first foot and the ball; and a speed, angle, and spin of the ball leaving the first foot; and predict a trajectory of the soccer ball using the motion values, in response to recognition of the moving body as a ball and detection of the hitting body as a bat, the motion analysis unit is configured to:

determine motion values including an impact speed and angle of impact of the bat with the ball; a position of impact between the bat and the ball; a trajectory of the bat; and a speed, angle, and spin of the ball leaving the bat; and predict a trajectory of the ball using the motion values, and in response to recognition of the moving body as a ball and detection of the hitting body as a club head, the motion analysis unit is configured to:

determine motion values including an impact speed and a face angle of the club head at impact with the ball; a position of impact between the club head and the ball; a trajectory of the club head; and a speed, launch angle, azimuth, and spin of the ball leaving the club head; and predict a trajectory of the ball using the motion values.

\* \* \* \* \*